United States Patent [19]
Edgerly et al.

[11] Patent Number: 6,074,251
[45] Date of Patent: Jun. 13, 2000

[54] SHIELDED HIGH DENSITY PATCH PANEL

[75] Inventors: Jeffrey Edgerly, Bristol; John A. Siemon, Woodbury; Valerie Rybinski, Bethlehem, all of Conn.; Andrew Cliffin, Surrey, United Kingdom

[73] Assignee: The Siemon Company, Watertown, Conn.

[21] Appl. No.: 09/085,473

[22] Filed: May 27, 1998

Related U.S. Application Data

[60] Provisional application No. 60/049,228, Jun. 9, 1997.

[51] Int. Cl.[7] ........................................ H01R 9/03
[52] U.S. Cl. ............................ 439/610; 439/92; 439/98; 439/99; 439/608; 439/609; 439/579; 439/540.1; 439/479
[58] Field of Search ..................... 439/610, 608, 439/609, 92, 98, 99, 579, 540.1, 497

[56] References Cited

U.S. PATENT DOCUMENTS

| | | | |
|---|---|---|---|
| 5,259,772 | 11/1993 | Fusselman et al. | 439/108 |
| 5,380,223 | 1/1995 | Marsh et al. | 439/610 |
| 5,466,175 | 11/1995 | Onoda | 439/610 |
| 5,518,421 | 5/1996 | Davis | 439/607 |
| 5,639,267 | 6/1997 | Loudermilk . | |
| 5,660,558 | 8/1997 | Osanai et al. | 439/353 |
| 5,683,269 | 11/1997 | Davis et al. | 439/607 |
| 5,688,145 | 11/1997 | Liu . | |
| 5,766,041 | 6/1998 | Morin et al. . | |
| 5,807,137 | 9/1998 | Janota et al. | 439/607 |

OTHER PUBLICATIONS

Shielded Patch Panel–Horizontal PC Board Mount Type, Full Enterprise Corporation Manufacturer & Exporter, Taipei, Taiwan, date unknown.
Patch Panels, Telesafe, Nov., 1996.
BICCBrand–Rex, Millennium Installation Manual, Issue 1, Nov., 1995.
Performance breakthrough, R W. Data, Reader Enquiry No. 28, date unknown.
Networking 3, Vero Electronics Sales, date unknown.
Telesafe info, Product data sheet, Telesafe AS, Aug. 1998.

*Primary Examiner*—Paula Bradley
*Assistant Examiner*—Truc Nguyen
*Attorney, Agent, or Firm*—Cantor Colburn LLP

[57] ABSTRACT

A shielded patch panel including a shield coupler that electrically connects a shield layer from an incoming cable to the shielded housing of a modular outlet. The shield layer of a shielded incoming cable is connected to the shield coupler through a spade that facilitates installation of the incoming cable. The shield coupler includes a plurality of arms that electrically connect the shield layer of the incoming cable to a shielded housing of the modular outlet. The shield coupler enhances the transfer impedance of the screened patch panels and results in compliance with the transfer impedance requirements.

10 Claims, 6 Drawing Sheets

SHIELDED HIGH DENSITY PATCH PANEL

CROSS-REFERENCES TO RELATED APPLICATIONS

This application claims priority to U.S. provisional patent application No. 60/049,228 filed Jun. 9, 1997.

BACKGROUND OF THE INVENTION

1. Field of the Invention

The invention relates generally to shielded telecommunications connectors and in particular to a shielded patch panel including a shield coupler for connecting a cable shield to a telecommunications outlet shield.

2. Prior Art

Shielded telecommunication connectors and screened (e.g. shielded) cables are often used for telecommunications cabling at both a work area (i.e. user area) and a telecommunications closet. Currently available in the marketplace are shielded, high density patch panels for use in a telecommunications closet. None of these conventional patch panels, however, electrically connect the shield of the screened cable to the shield of the jack. As a result, the conventional screened patch panels do not comply with the transfer impedance requirements of ISO/IEC 11801.

Another drawback to conventional shielded patch panels is the difficulty in preparing the incoming cable for connection to the patch panel. Some cables are extremely difficult to prepare correctly for proper termination to the conventional screened patch panel. The typical method requires the outer jacket to be cut and removed without removing or damaging the cable inner shield or foil. The problem occurs in some types of cable where it is extremely difficult to remove the outer jacket without also removing the inner foil shield. When the inner foil shield is inadvertently removed, it regularly requires the installer to rework the cable preparation so that the cable can be properly terminated in the patch panel. This results in an increase in the installation time.

SUMMARY OF THE INVENTION

The above-discussed and other drawbacks and deficiencies of the prior art are overcome or alleviated by the shielded patch panel of the present invention. The invention is a shielded patch panel including a shield coupler that electrically connects the shield layer from an incoming cable to the shielded housing of a modular outlet. The ground screen of a shielded incoming cable is connected to the shield coupler through a spade that facilitates installation of the incoming cable. The shield coupler includes a plurality of arms that electrically connect the ground screen of the incoming cable to a shielded housing of a modular outlet. The ground coupler enhances the transfer impedance of the screened patch panels and results in compliance with the transfer impedance requirements of ISO/IEC 11801.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
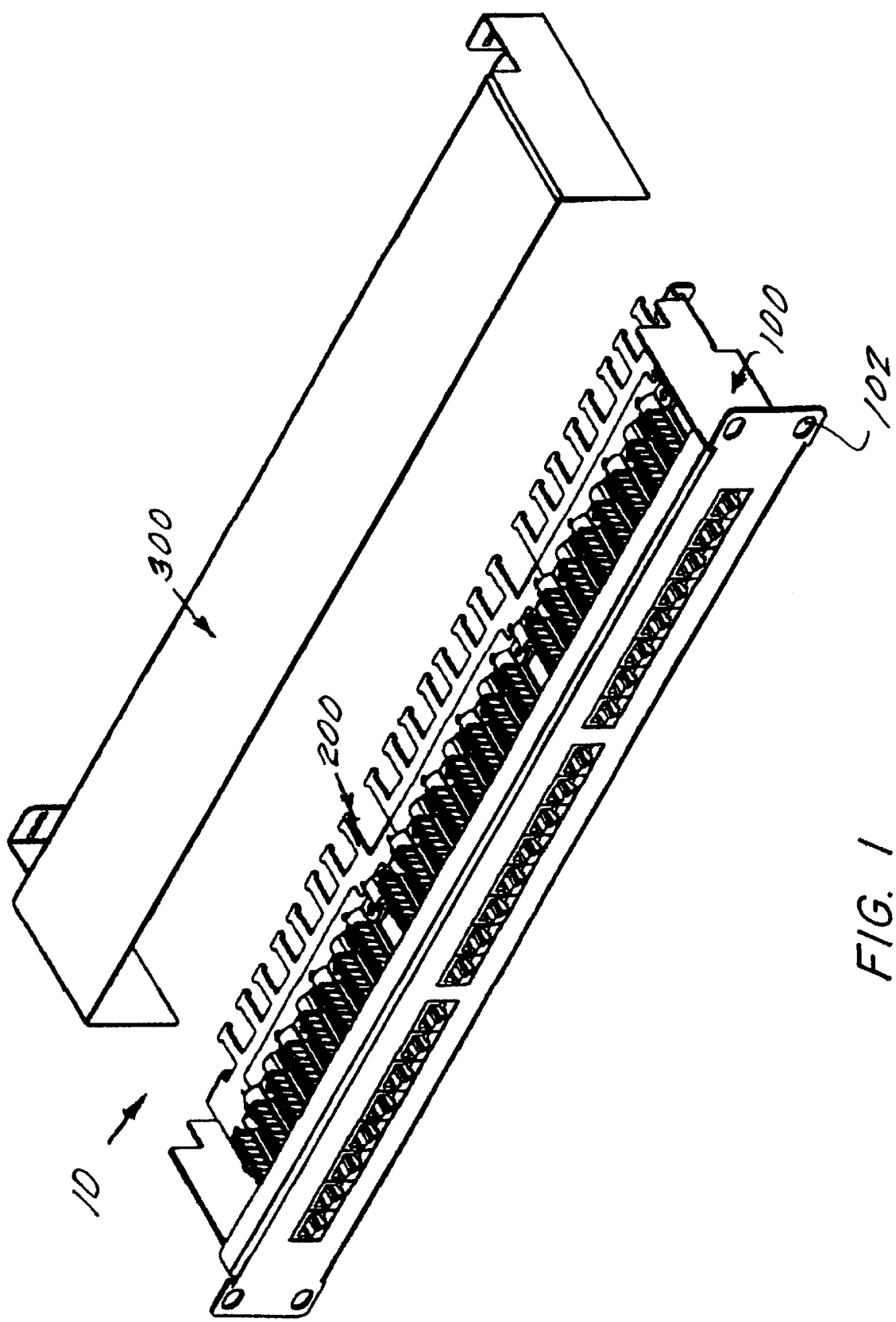
FIG. 1 is a perspective view of a panel assembly.

FIG. 1 is a perspective view of a panel assembly 10 made up of a front panel 100, a ground pan assembly 200 and a cover 300. Front panel 100 includes four slotted holes 102 for mounting the panel assembly 10 to a standard rack which is typically 19" wide. The ground pan assembly 200 is riveted to the front panel 100 and is described in detail below with reference to FIGS. 2–4. Cover 300 is secured to the ground pan assembly through fasteners and is described in detail below with reference to FIG. 7.

Figure 2:
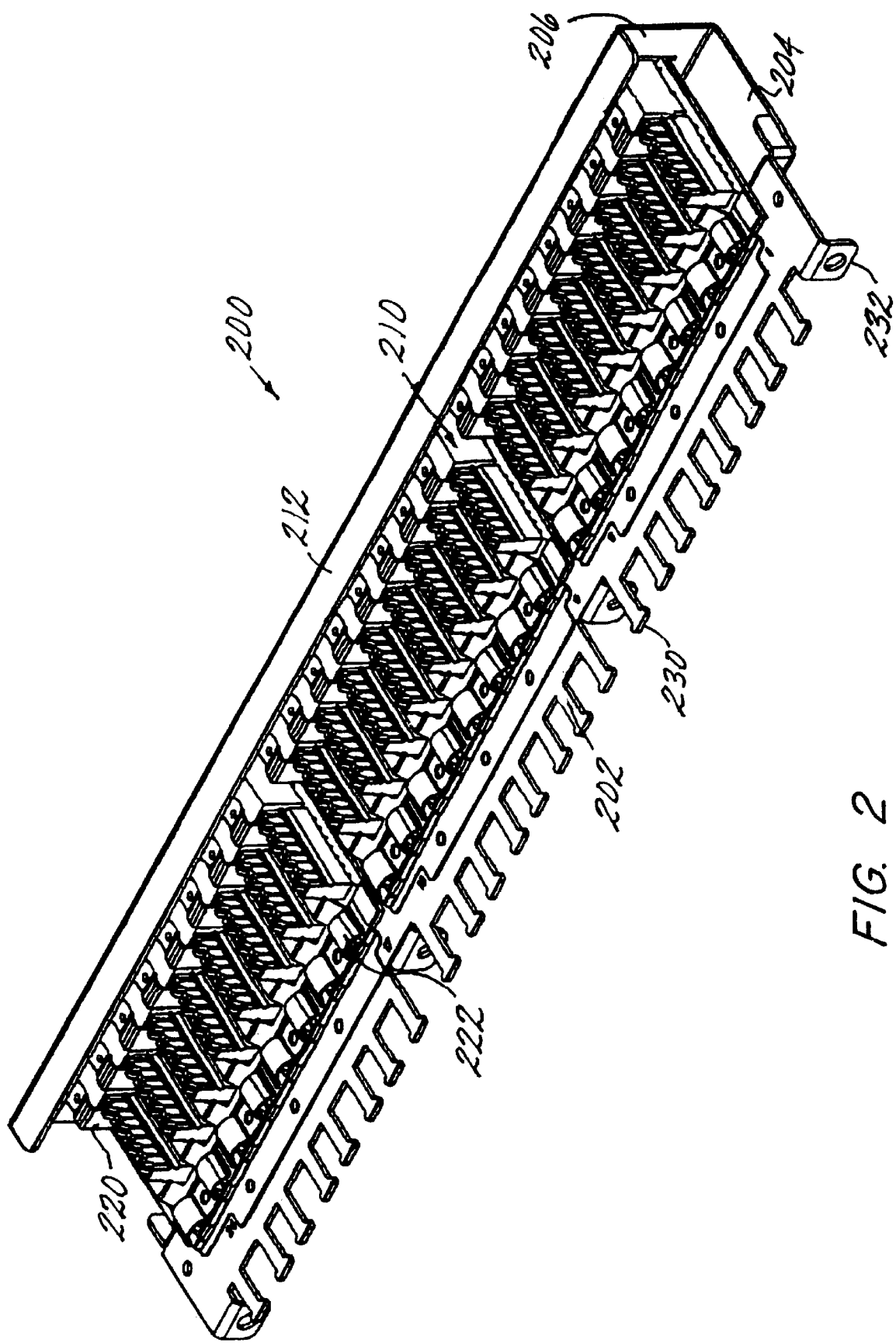
FIG. 2 is a perspective view of a ground pan assembly.
Figure 3:
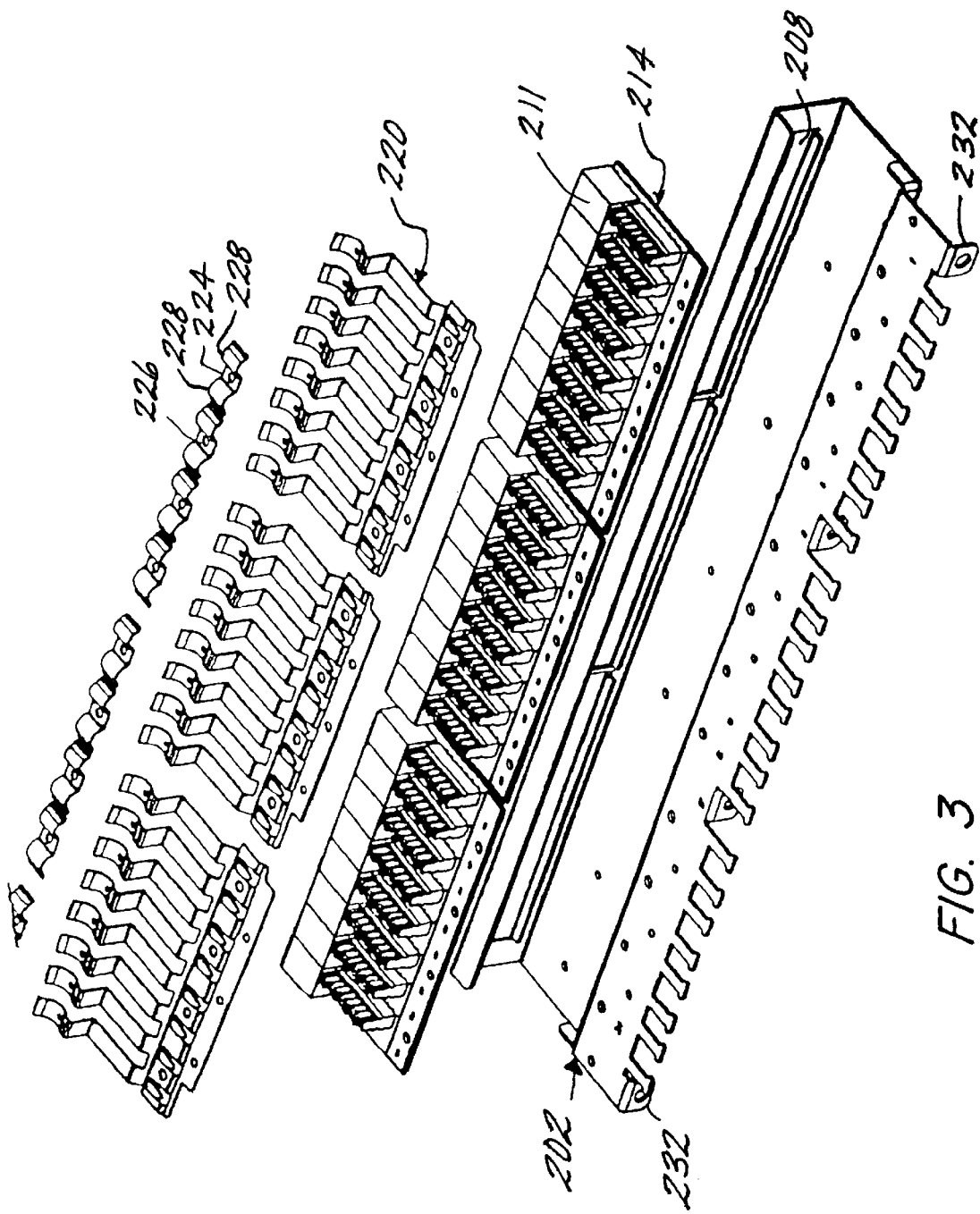
FIG. 3 is an exploded perspective view of the ground pan assembly.

FIG. 2 is a perspective view of the ground pan assembly 200. The ground pan assembly includes a ground pan 202 having a generally flat, rectangular base 204 coupled to a front face 206. The front face 206 is substantially perpendicular to the base 204 and includes openings 208 (FIG. 3) providing access to shielded outlets 210 mounted in the ground pan 202. Suitable shielded outlets 210 are shielded outlets sold under the trademark SM available from The Siemon Company. Shielded outlets 210 are part of a printed circuit board assembly 214 (FIG. 3). It is understood that a variety of shielded outlets may be used and the present invention is not limited to printed circuit board mounted shielded outlets. The rectangular housing 211 of the shielded outlet 210 is conductive. Extending away from front face 206 is a rearward facing lip 212 which is substantially perpendicular to front face 206. Lip 212 increases the strength of the ground pan 202 and provides a surface that directs the shield coupler against the shielded outlet 210 as described herein.

The shield coupler 220 is positioned under the front lip 212 and riveted to back of the ground pan 202. The proper force is maintained between the distal portion 262 (FIG. 4) of the shield coupler 220 and shielded housing 211 of the jack by positioning the distal portion 262 under lip 212.

Shield couplers 220 provide a conductive path from the ground pan 202 to the conductive housing 211 of shielded outlets 210. A series of ground clips 222 secure the incoming cable to the shield couplers 220. Each ground clip 222 includes a planar section 224 having a hole 226 formed therein for receiving a fastener and two arcuate extensions 228 coupled to said planar section. The incoming cable is positioned beneath an arcuate extension 228 and is secured to the shielded coupler 220 though pressure from the ground clip 222. Ground pan 202 includes a plurality of fingers 230 having a space therebetween that provide for strain relief for the incoming cable. Ground pan 202 also includes a plurality of ground lugs 232 for electrically connecting the ground pan 202 to ground.

Figure 4:
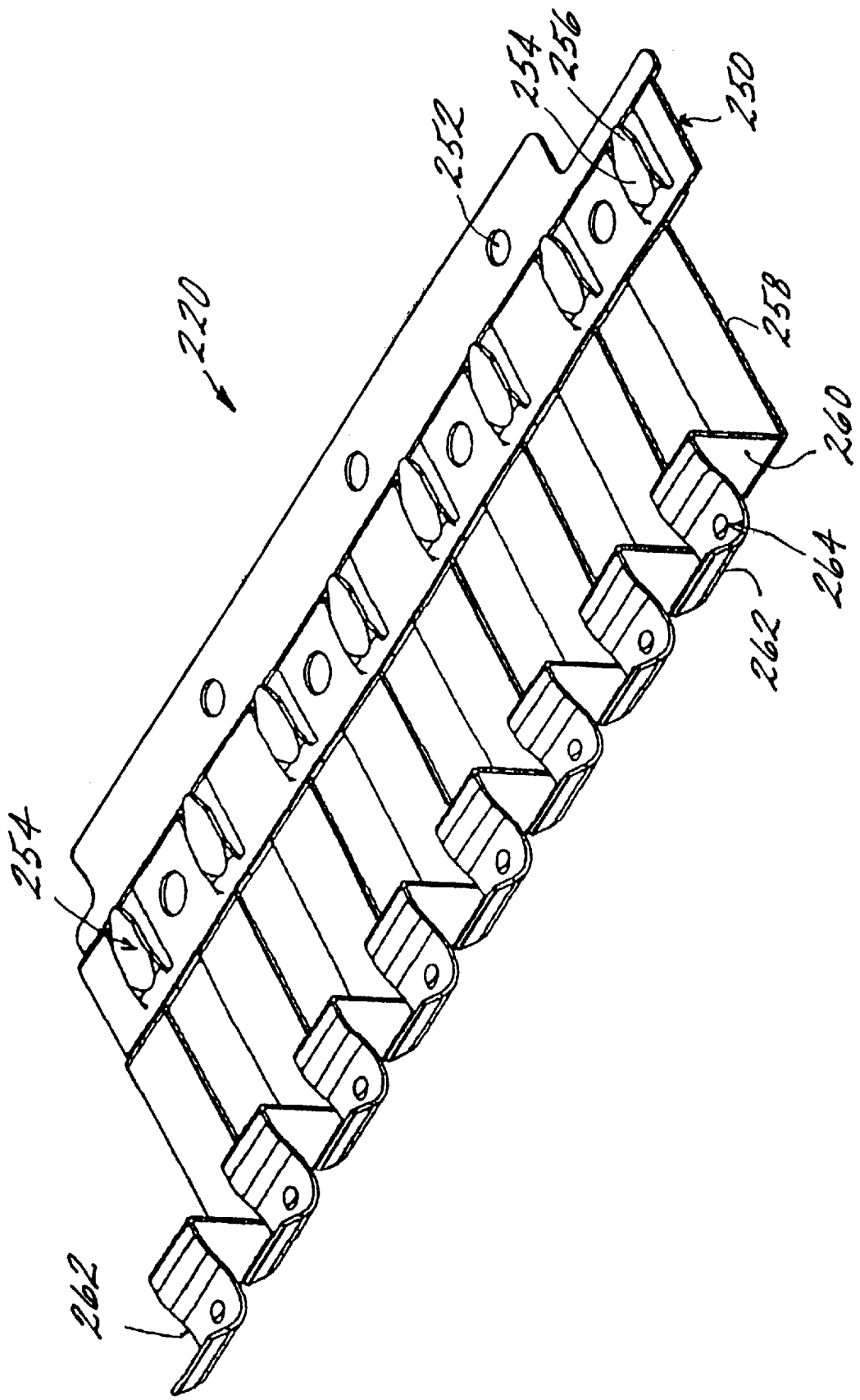
FIG. 4 is a perspective view of a ground coupler.

FIG. 4 is a perspective view of the shield coupler 220. The shield coupler 220 provides an electrical connection from the shield layer of an incoming cable to the conductive housing 211 of connector 210. The shield coupler 220 includes a generally planar base 250 which includes holes 252 for securing the shield coupler to the ground pan through fasteners. Base 250 includes a plurality of spades 254 extending away from the surface of base 250. Each spade 254 has a distal end 256 which is tapered to a rounded point. The spade 254 could be a removable component. Spade 254 facilitates installation of the incoming cable as described herein. Extending away from base 250 are a plurality of arms 258. Arms 258 bend approximately 90 degrees to define intermediate section 260 and then bend approximately 90 degrees to define a distal section 262. Distal section 262 is arcuate and is shaped in a curve that is directed downwards and then proceeds upwards to define an arcuate path. A downwardly extending protrusion 264 extends away from the arcuate surface. Protrusion 264 contacts the shielded outlet 211.

Figure 6:
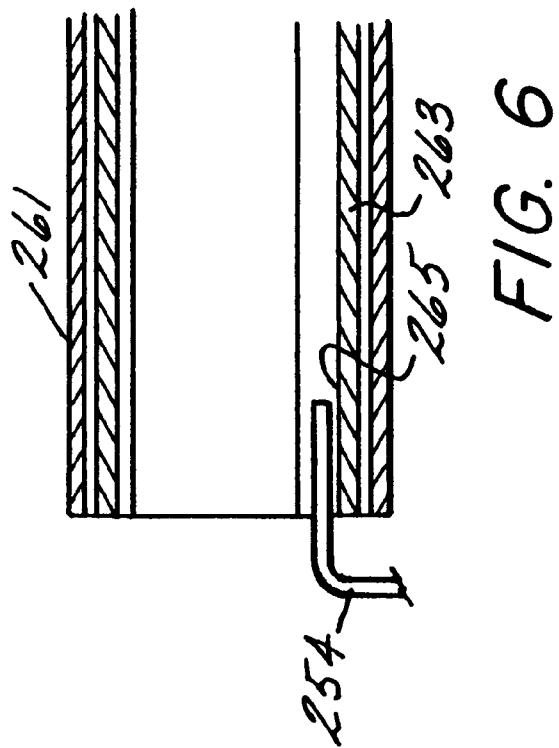
FIG. 6 is a side view of the spade and the incoming cable.
Figure 5:
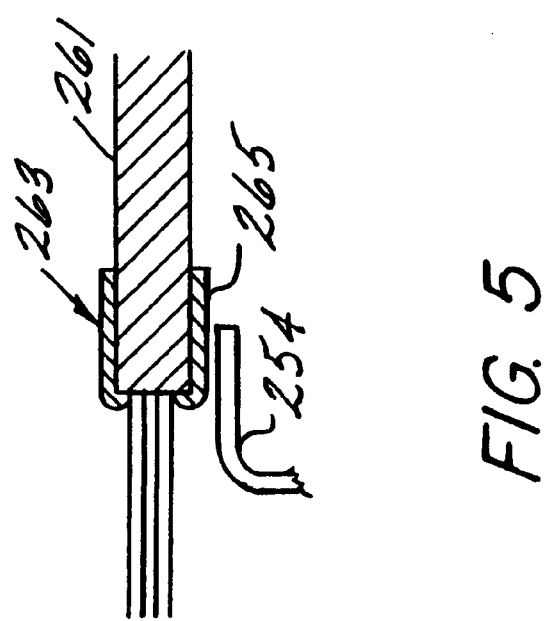
FIG. 5 is side view of a spade and an incoming cable.

The spade 254 facilitates connection of the shield layer of an incoming cable to the shield coupler 220. Shown in FIGS. 5 and 6 are two configurations for coupling a cable to the spade 254. Incoming cable 261 includes a shield or screen 263 having an interior surface 265 that is conductive. FIG. 5 illustrates a first mounting configuration in which the screen 263 is folded back over the outside of the cable 261 so that the conductive surface 265 is exposed. The conductive surface 265 is placed in contact with spade 254 and held in place with ground clip 222.

FIG. 6 shows an alternative mounting arrangement in which the screen 263 is not folded over the outside of the cable 261. Rather, spade 254 is inserted into cable 261 so that the spade 254 contacts the interior, conductive surface 265 of the screen 263. The cable 261 is then secured in place through ground clip 222.

Figure 7:
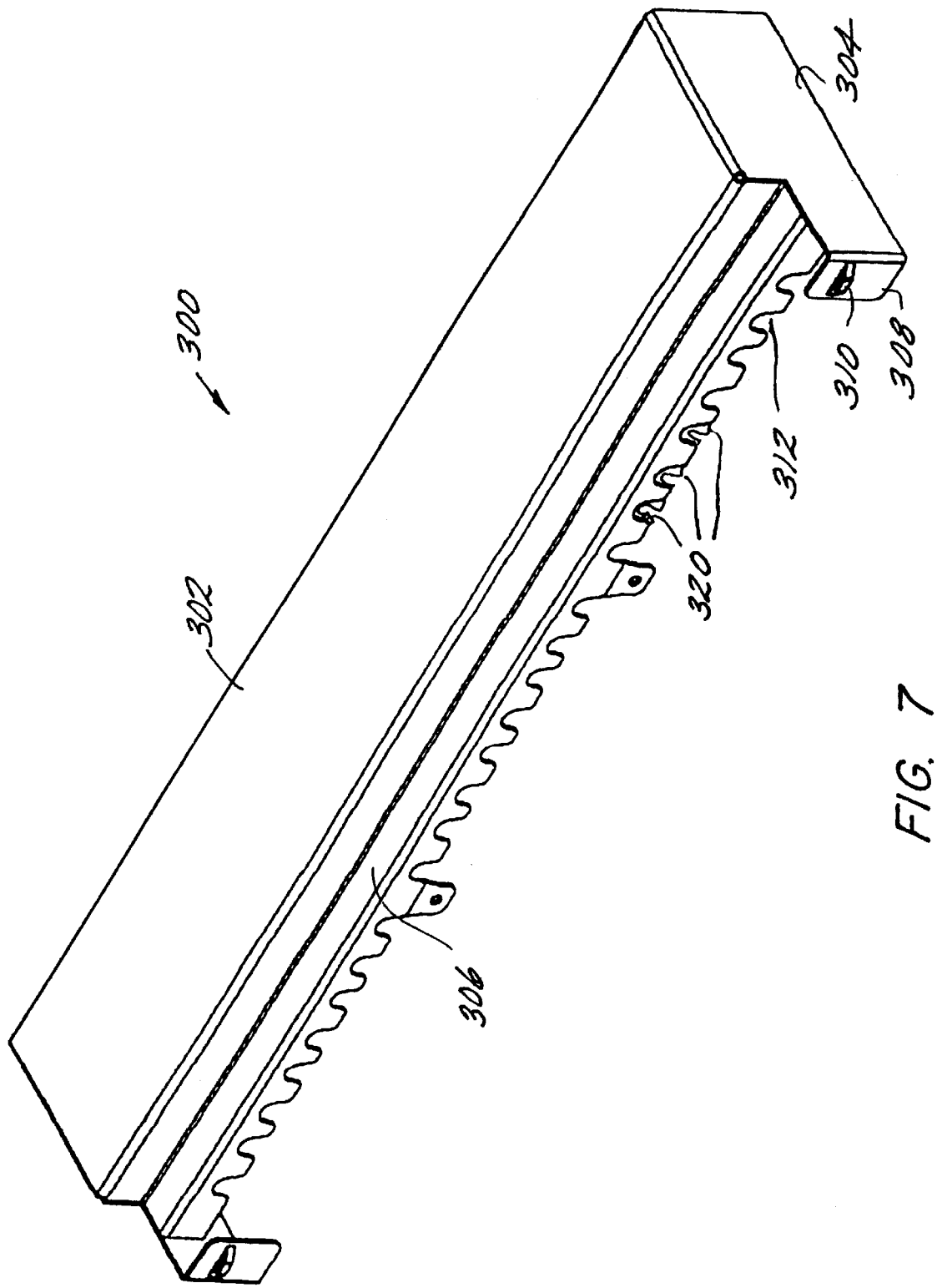
FIG. 7 is a perspective view of a cover.

FIG. 7 is a perspective view of cover 300 having a top 302, two sides 304 and a rear wall 306. The side walls 304 extend past rear wall 306 and bend inwards approximately 90 degrees to define tab 308. Tab 308 includes a cable tie down protrusion having an opening therein for receiving a cable tie and securing incoming cable to the cover 300. The rear wall includes a plurality of notches 312 along a bottom surface of the rear wall. Each of the notches allows an incoming cable to enter the enclosure. The notches 312 are aligned with fingers 230 on ground pan 202. The cover 300 slides into place from the back enclosing the ground pan assembly and providing EMI/RFI protection. Affixed to the cover 300 in openings 312 is a conductive gasket 320 which conforms to the shape of the cable thus shielding the entire cable entrance area.

The ground pan 202, ground clip 222 and cover 300 are required to be grounded with the mounting rack and are fabricated of cold rolled steel with a conductive zinc plating. The front panel 100 is not required to be electrically connected to the mounting rack and is fabricated from an anodized aluminum. The shield coupler 220 is required to be conductive and is made from brass with a nickel or tin plating.

The present invention provides a system that effectively and economically complies with the requirements of transfer impedance and the category 5 transmission performance for national and international standards for connecting hardware and provides an easy method to terminate different types of screened cable.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A shielded patch panel comprising:

a ground pan assembly including a conductive ground pan for connection to ground;

a plurality of outlets mounted to said ground pan, each of said outlets having a conductive outlet housing, each of said outlets having an opening for receiving a plug, a shield coupler electrically connected to said ground pan, said shield coupler including a spade for making electrical contact with a ground screen in an incoming cable and an arm for making electrical contact with one of said conductive outlet housings.

2. The patch panel of claim 1 wherein said arm has an arcuate distal portion.

3. The patch panel of claim 2 wherein said arcuate distal portion includes a protrusion for contacting said conductive outlet housing.

4. The patch panel of claim 2 wherein ground pan assembly includes a base, a front wall and a lip extending away from said front wall, said arcuate distal portion being positioned beneath said lip.

5. The patch panel of claim 1 wherein ground pan assembly includes a plurality of spaced fingers for providing strain relief to incoming cables.

6. The patch panel of claim 5 further comprising a cover having a plurality of notches aligned with said fingers.

7. The patch panel of claim 1 wherein said spade is tapered.

8. The patch panel of claim 1 further comprising a plurality of ground clips for securing incoming cable to said ground pan assembly.

9. The patch panel of claim 1 further comprising a cable having an outer jacket and an inner shield layer, said shield layer being folded over said outer jacket and in electrical contact with said spade.

10. The patch panel of claim 1 further comprising a cable having an outer jacket and an inner shield layer, said shield layer being contained within said outer jacket and said spade positioned within said cable and in electrical contact with said shield layer.

* * * * *